United States Patent [19]

Morita

[11] 4,156,680
[45] May 29, 1979

[54] SCORCH INHIBITED VULCANIZABLE RUBBER COMPOSITIONS CONTAINING CARBAMIC ACID ESTERS

[75] Inventor: Eiichi Morita, Copley, Ohio

[73] Assignee: Monsanto Company, St. Louis, Mo.

[21] Appl. No.: 946,242

[22] Filed: Sep. 27, 1978

Related U.S. Application Data

[63] Continuation-in-part of Ser. No. 929,769, Jul. 31, 1978, abandoned.

[51] Int. Cl.² ............................................. C08K 5/44
[52] U.S. Cl. ..................... 260/45.85 A; 260/45.9 NC; 260/45.9 KA; 260/45.9 E; 260/783; 260/780; 526/3; 526/19; 526/30
[58] Field of Search ................ 260/45.9 NC, 45.85 A, 260/783, 780, 45.9 KA, 45.9 E; 526/3, 19, 30

[56] References Cited

U.S. PATENT DOCUMENTS

| | | | |
|---|---|---|---|
| 2,862,051 | 1/1975 | Coran et al. | 260/780 |
| 3,546,185 | 12/1970 | Coran et al. | 526/19 |
| 3,562,225 | 2/1971 | Coran et al. | 260/780 |
| 3,579,460 | 5/1971 | Kerwood | 260/780 |
| 3,671,503 | 6/1972 | Schubert et al. | 260/780 |
| 3,705,135 | 12/1972 | Wolfinger | 526/3 |
| 3,770,826 | 11/1973 | Schubert et al. | 260/780 |
| 3,775,428 | 11/1973 | Coran et al. | 260/780 |
| 3,895,060 | 7/1975 | Son | 260/780 |
| 3,974,163 | 8/1976 | Coran | 260/780 |

FOREIGN PATENT DOCUMENTS 49-14533 4/1974 Japan.
396326 8/1973 U.S.S.R.

*Primary Examiner*—V. P. Hoke
*Attorney, Agent, or Firm*—Larry R. Swaney

[57] ABSTRACT

Vulcanizable rubber compositions inhibited from premature vulcanization by inhibitors comprising a class of aryl carbamic acid esters of the formula

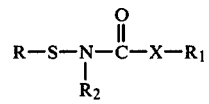

in which R and $R_1$ are mono-valent organic radicals, $R_2$ is aryl and X is oxygen or sulfur are described.

17 Claims, No Drawings

SCORCH INHIBITED VULCANIZABLE RUBBER COMPOSITIONS CONTAINING CARBAMIC ACID ESTERS

This application is a continuation-in-part application of patent application Ser. No. 929,769 filed July 31, 1978 now abandoned.

This invention relates to improved vulcanizable rubber compositions inhibited from premature vulcanization and to an improved process for inhibiting premature vulcanization of rubber using aryl carbamic acid esters which are especially potent premature vulcanization inhibitors.

BACKGROUND OF THE INVENTION

N-(Arylthio)carbamic acid esters and N,N-di(arylthio)-carbamic acid esters are known prevulcanization inhibitors for rubber. Japanese patent No. 49-14533. The di-thio substituted esters are more potent inhibitors but are more expensive since two moles of sulfenyl halide are required when making the compound. The mono-thio substituted esters exhibit reduced inhibitor activity.

SUMMARY OF THE INVENTION

It has now been discovered that N-(thio) aryl carbamic acid esters are especially potent prematue vulcanization inhibitors. The presence of a benzene radical attached to the nitrogen atom enhances the inhibitor activity. Accordingly, vulcanizable rubber compositions of the invention comprise sulfur-vulcanizable rubber, sulfur-vulcanizing agent, organic vulcanization accelerating agent and, in an amount effective to inhibit premature vulcanization, a compound of the formula

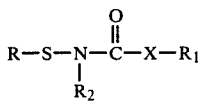

wherein X is oxygen or sulfur, R is $C_1$–$C_{12}$ primary or secondary alkyl or said alkyl radical substituted by formyl or $C_2$–$C_7$ acyl, $C_7$–$C_{10}$ aralkyl, $C_5$–$C_{12}$ cycloalkyl, or $R_2$; $R_1$ is $C_1$–$C_{12}$ alkyl, $C_7$–$C_{10}$ aralkyl, $C_5$–$C_{12}$ cycloalkyl, or $R_2$; $R_2$ is phenyl, naphthyl and phenyl substituted by $(-R_3)_x$ wherein x is 1, 2, 3 and $R_3$ is $C_1$–$C_{12}$ alkyl, $C_1$–$C_{12}$ alkoxy, $C_1$–$C_{12}$ alkyl-thio, chloro, bromo, cyano or nitro.

Inhibitors of the invention may be prepared by reacting a sulfenyl chloride either with an alkali metal salt of a carbamic acid ester or with a carbamic acid ester in the presence of a hydrogen chloride acceptor. The carbamic acid ester intermediates may be prepared by reacting an isocyanate and an alcohol, preferably in the presence of an amine catalyst. Certain inhibitors of the invention and suitable procedures for preparing them are described in USSR Pat. No. 396,326.

Examples of satisfactory R, $R_1$ and $R_2$ radicals (except R cannot be tertiary alkyl) are methyl, ethyl, propyl, isopropyl, n-butyl, sec.butyl, isobutyl, t-butyl(1,1-dimethylethyl), pentyl, hexyl, heptyl, octyl, t-octyl(1,1,3,3-tetramethyl butyl), nonyl, decyl, dodecyl, cyclopentyl, cyclohexyl, 4-methylcyclohexyl, cycloheptyl, cyclooctyl, cyclodecyl, cyclododecyl, benzyl, α-methylbenzyl, α,α-dimethylbenzyl, phenethyl, phenyl, naphthyl, 4-methylphenyl, 4-chlorophenyl, 2-methyl-4-t-butylphenyl, 4-t-butylphenyl, 2-methylphenyl, 3-methylphenyl, 4-methoxyphenyl, 4-methylthiophenyl, and 3-isopropylphenyl. Examples of satisfactory acyl radicals are acetyl, propionyl and butyryl.

Compounds in which $R_2$ is phenyl comprise a preferred subclass of inhibitors. Compounds in which R is $C_5$–$C_8$ cycloalkyl or secondary alkyl, especially isopropyl, comprise another preferred subclass of inhibitors. Compounds in which $R_2$ is phenyl, $R_1$ is methyl, X is oxygen, and R is $C_5$–$C_8$ cycloalkyl or $C_3$–$C_8$ secondary alkyl are especially preferred.

Illustrative examples of inhibitors of the invention are:

(Cyclohexylthio)phenylcarbamic acid, methyl ester
(Phenylthio)phenylcarbamic acid, methyl ester
(Isopropylthio)phenylcarbamic acid, methyl ester
(Benzylthio)phenylcarbamic acid, methyl ester
(Methylthio)phenylcarbamic acid, methyl ester
(α-methylbenzylthio)phenylcarbamic acid, methyl ester
(Cyclohexylthio)phenylcarbamic acid, phenyl ester
(Phenylthio)phenylcarbamic acid, phenyl ester
(Isopropylthio)phenylcarbamic acid, phenyl ester
(Benzylthio)phenylcarbamic acid, phenyl ester
(Methylthio)phenylcarbamic acid, phenyl ester
(α-methylbenzylthio)phenylcarbamic acid, phenyl ester
(Cyclohexylthio)phenylcarbamic acid, cyclohexyl ester
(Phenylthio)phenylcarbamic acid, cyclohexyl ester
(Isopropylthio)phenylcarbamic acid, cyclohexyl ester
(Benzylthio)phenylcarbamic acid, cyclohexyl ester
(Methylthio)phenylcarbamic acid, cyclohexyl ester
(α-methylbenzylthio)phenylcarbamic acid, cyclohexyl ester
(Cyclohexylthio)phenylcarbamic acid, benzyl ester
(Isopropylthio)phenylcarbamic acid, benzyl ester
(Phenylthio)phenylcarbamic acid, benzyl ester and the corresponding carbamothioic acid esters.

The inhibitors of the invention are incorporated into rubber stocks by mixing on a mill or in an internal mixer such as a Banbury mixer. However, the inhibitors may be incorporated by addition to latex, if desired. The process of the invention is particularly applicable to sulfur-vulcanizable rubber compositions which rubber compositions contain a sulfur vulcanizing agent such as an amine disulfide or a polymeric polysulfide but preferably, the vulcanizing agent is elemental sulfur. Rubber compositions containing organic accelerating agents are particularly improved by the inhibitors of the invention. Any organic accelerating agents in an amount effective (generally about 0.1–5 parts by weight accelerator per 100 parts by weight rubber) to accelerate the sulfur vulcanization of rubber is satisfactory in the practice of this invention. Examples of suitable accelerators are described in U.S. Pat. No. 3,546,185, col. 9, lines 53–75 and in U.S. Pat. No. 3,780,001, col. 4, lines 43–72. The process of the invention is applicable to a wide variety of natural and synthetic rubbers and mixtures thereof and especially applicable to diene rubbers. Examples of satisfactory rubbers are described in U.S. Pat. No. 3,546,185, col. 10, lines 15–21 and U.S. Pat. No. 3,780,001, col. 5, lines 5–33. The vulcanizable composition may also contain conventional compounding ingredients such as reinforcing pigments, extenders, processing oils, antidegradants and the like.

Small amounts of inhibitors are effective to inhibit premature vulcanization. Improvements in processing safety may be observed with 0.05 parts or less of inhibitor per 100 parts rubber. Although there is no upper limit in the amount of inhibitor used, generally the amount does not exceed 5 parts inhibitor per 100 parts rubber. Typically, the amount of inhibitor added is about 0.1 to 2.5 parts per 100 parts rubber with amounts of about 0.2 to 1 part inhibitor per 100 parts rubber being normally used. Methods for determining scorch times and curing characteristics of rubber stocks used in demonstrating this invention are described in U.S. Pat. No. 3,546,185, col. 13, lines 30-53.

PREFERRED EMBODIMENTS

A suitable procedure for preparing inhibitors of the invention comprises adding, at between 0°-75° C., usually at about room temperature, a sulfenyl chloride to a slurry of a carbamic acid ester (or thiocarbamic acid ester) in an inert organic medium, such as heptane, in the presence of an acid acceptor, such as triethylamine. The amine salt by-product is removed by filtration. The filtrate is washed with water and dried with sodium sulfate. The product is recovered by evaporating the solvent and is further purified by conventional procedures.

An alternate procedure for preparing inhibitors of the invention comprises reacting a sulfenyl chloride and an alkali metal salt of a carbamic acid ester. The carbamic acid ester alkali metal salt intermediate may be prepared by reacting an alkali metal alcoholate and a carbamic acid ester in an inert organic medium. The alcohol by-product is stripped from the reaction mixture by distillation. The alcoholate reactant is selected so that the alcohol portion will not exchange with the ester, preferably, the alcohol portion and ester are identical. The resulting slurry of carbamic acid ester alkali metal salt may be reacted, without further purification, with the sulfenyl chloride reactant. The sulfenyl chloride is generally added dropwise at room temperature to the aforesaid slurry. Salt by-product and any unreacted carbamic acid ester alkali metal salt is removed by filtration. The product is recovered by evaporation and generally is further purified by recrystallization from an appropriate solvent, such as, hexane.

EXAMPLE 1

To a suitable reactor equipped with a stirring and temperature controlling means, there are charged phenyl carbamothioic acid, S- cyclohexyl ester, 41.1 g. (0.20 m), triethylamine, 20.4 g. and 200 ml of heptane. While stirring, a solution of cyclohexanesulfenyl chloride (0.21 m) in 150 ml of heptane is added dropwise at 24°-26° C. over a 50 minute period. After stirring an additional 30 minutes, 200 ml of water is added. The reaction mixture is filtered and the organic layer of the filtrate is separated and washed two times with 200 ml portions of water. After drying over $Na_2SO_4$, the organic layer is stripped by vacuum distillation to give 58.2 grams of solid crude product. The crude product is slurried in water, filtered and air-dried. (Cyclohexylthio)-phenylcarbamothioic acid, S-cyclohexyl ester, (56.1 g) a white solid m.p. 89°-90° C., is recovered. Chemical analysis gives 18.51% sulfur compared with 18.34% sulfur calculated for $C_{19}H_{27}NOS_2$.

EXAMPLE 2

To a stirred slurry comprising 0.25 moles of sodium phenylcarbamic acid, methyl ester and 250 ml of heptane, there is added, at 25° C. over a period of 40 minutes, a heptane solution of 0.25 moles of 2-propanesulfenyl chloride. Stirring is continued for 2 hours, then the reaction mixture is left standing over the weekend. Water is added and the reaction mixture is filtered. The organic layer of the filtrate is washed with water and the solvent is then removed by vacuum distillation. The residue is washed with heptane and air-dried. (Isopropylthio)phenylcarbamic acid, methyl ester, m.p. 52°-53° C., recrystallized from heptane, is recovered. Analysis gives 13.89% sulfur compared with 14.23% sulfur calculated for $C_{11}H_{15}NO_2S$.

Other compounds prepared in a similar manner are shown in Table 1.

Table 1

| Example No. | Name | Melting Point, °C. | Sulfur Analysis, % Calc. | Sulfur Analysis, % Found |
|---|---|---|---|---|
| 3 | (Cyclohexylthio)phenyl-carbamic acid, methyl ester | 78-79 | 12.08 | 11.92 |
| 4 | (Phenylthio)phenylcarbamic acid, methyl ester | 66-67 | 12.36 | 12.32 |
| 5 | (Cyclohexylthio)phenyl-carbamic acid, phenyl ester | 85 | 9.79 | 10.47 |
| 6 | (Isopropylthio)phenyl-carbamic acid, phenyl ester | 95-96 | 11.16 | 11.57 |
| 7 | (Phenylthio)phenyl-carbamic acid, phenyl ester | 86-86.5 | 9.98 | 10.53 |
| 8 | (Cyclohexylthio)phenyl-carbamic acid, 2-(1,1-dimethylethyl)-5-methyl phenyl ester | 99-99.5 | 8.06 | 8.23 |
| 9 | (Cyclohexylthio)phenyl-carbamothioic acid,(1,1)-dimethylethyl)-S-ester | 82-83 | 19.82 | 18.40 |
| 10 | (Cyclohexylthio)phenyl-carbamothioic acid, S-phenyl ester | 67-67.5 | 18.67 | 18.55 |

The process of the invention is demonstrated by using the following natural rubber and synthetic rubber stocks.

| | Stocks NR | Stocks SBR/PB |
|---|---|---|
| Smoked sheets | 100 | — |
| Oil-extended styrene-butadiene rubber 1712 | — | 89 |
| Cis-4-polybutadiene rubber | — | 35 |
| Carbon black | 45 | 67 |
| Zinc oxide | 3 | 3 |
| Stearic acid | 2 | 1 |
| Processing oil | 5 | 15 |
| Wax | — | 2 |
| N-(1,3-dimethylbutyl)-N'-(phenyl)-p-phenylenediamine | 2 | 2 |
| Sulfur | 2.5 | 2.0 |
| N-(tert-butyl)-2-benzothiazole-suflenamide | 0.5 | 1.2 |
| | 160 | 217.2 |

Portions of the masterbatches containing no inhibitors are controls. A quantity of inhibitor is incorporated into other portions of the masterbatches. The properties of the vulcanizable compositions are measured by conventional methods as described above. The results are shown in Tables 2, 3 and 4.

Referring to Table 2, stocks 1 and 5 are controls, respectively, for the stocks immediately following the controls. The data show that all the carbamic acid esters are potent inhibitors for premature vulcanization with 0.3 parts by weight inhibitor per 100 parts by weight rubber resulting in an increase of scorch delay between 59–120%. The data indicate that inhibitor activity is affected by the nature of the substituents. For example, the methyl esters are more potent inhibitors than the phenyl esters. Also, the isopropylthio and cyclohexylthio compounds are more effective than the corresponding phenylthio compounds.

The inhibitor activity of phenylcarbamothioic acid esters is illustrated in Table 3. The data show that the aliphatic esters exhibit greater inhibition of premature vulcanization than the corresponding phenyl ester.

Table 2

| Stocks | 1 | 2 | 3 | 4 | 5 | 6 | 7 | 8 | 9 |
|---|---|---|---|---|---|---|---|---|---|
| NR stocks | 160 | → | → | → | → | → | → | → | → |
| (Cyclohexylthio)phenylcarbamic acid, methyl ester | — | 0.3 | — | — | — | — | — | — | — |
| (Phenylthio)phenylcarbamic acid methyl ester | — | — | 0.3 | — | — | — | — | — | — |
| (Isopropylthio)phenylcarbamic acid, methyl ester | — | — | — | 0.3 | — | — | — | — | — |
| (Cyclohexylthio)phenylcarbamic acid, phenyl ester | — | — | — | — | — | 0.3 | — | — | — |
| (Phenylthio)phenylcarbamic acid, phenyl ester | — | — | — | — | — | — | 0.3 | — | — |
| (Isopropylthio)phenylcarbamic acid, phenyl ester | — | — | — | — | — | — | — | 0.3 | — |
| (Cyclohexylthio)phenylcarbamic acid, 2-(1,1-dimethylethyl)-5-methyl phenyl ester | — | — | — | — | — | — | — | — | 0.3 |
| Mooney Scorch at 121° C. | | | | | | | | | |
| $t_5$, minutes | 36.1 | 72.9 | 60.1 | 79.5 | 33.3 | 60.6 | 53.0 | 65.0 | 59.3 |
| % increase in scorch delay | — | 102 | 67 | 120 | — | 82 | 59 | 95 | 78 |
| Stress-Strain at 153° C. | | | | | | | | | |
| $M_{100}$, MPa | 10.8 | 11.8 | 12.2 | 11.4 | 11.5 | 11.4 | 11.1 | 10.8 | 10.4 |
| UTS, MPa | 29.4 | 29.8 | 31.1 | 29.8 | 30.4 | 30.4 | 28.7 | 29.3 | 27.9 |
| Elong., % | 600 | 590 | 590 | 590 | 600 | 600 | 580 | 610 | 590 |

Table 3

| Stocks | 1 | 2 | 3 | 4 |
|---|---|---|---|---|
| NR stocks | 160 | 160 | 160 | 160 |
| (Cyclohexylthio)phenylcarbamothioic acid, S-cyclohexyl ester | — | 0.3 | — | — |
| (Cyclohexylthio)phenylcarbamothioic acid, S-(1,1 dimethylethyl)ester | — | — | 0.3 | — |
| (Cyclohexylthio)phenylcarbamothioic acid, S-phenyl ester | — | — | — | 0.3 |
| Mooney Scorch at 121° C. | | | | |
| $t_5$, minutes | 35.0 | 50.8 | 50.5 | 45.3 |
| % increase in scorch delay | — | 45 | 43 | 29 |
| Stress-Strain at 153° C. | | | | |
| $M_{300}$, MPa | 10.7 | 9.4 | 8.9 | 8.0 |
| UTS, MPa | 28.6 | 28.7 | 27.6 | 27.0 |
| Elong., % | 600 | 650 | 630 | 650 |

Table 4

| Stocks | 1 | 2 | 3 | 4 | 5 |
|---|---|---|---|---|---|
| SBR/PB stocks | 217.2 | → | → | → | → |
| (Cyclohexylthio)phenylcarbamic acid, methyl ester | — | 0.5 | — | — | — |
| (Cyclohexylthio)phenylcarbamic acid, phenyl ester | — | — | 0.5 | — | — |
| (Cyclohexylthio)phenylcarbamothioic acid, S-cyclohexyl ester | — | — | — | 0.5 | — |
| (Cyclohexylthio)phenylcarbamothioic acid, S-1,1-dimethylethyl ester | — | — | — | — | 0.5 |
| Mooney Scorch at 135° C. | | | | | |
| $t_5$, minutes | 23.0 | 42.5 | 37.8 | 31.7 | 31.6 |
| % increase scorch safety | — | 85 | 64 | 38 | 37 |
| Stress-Strain at 153° C. | | | | | |
| $M_{300}$, MPa | 8.6 | 8.3 | 7.6 | 7.8 | 7.6 |
| UTS, MPa | 20.0 | 19.0 | 18.4 | 19.0 | 18.3 |
| Elong., % | 570 | 560 | 570 | 570 | 580 |

Table 5

| Stocks | 1 | 2 | 3 | 4 | 5 |
|---|---|---|---|---|---|
| NR stock | 160 | → | → | → | → |
| (Phenylthio)phenylcarbamic acid, methyl ester | — | 0.3 | — | — | — |
| (Cyclohexylthio)phenylcarbamic acid, methyl ester | — | — | 0.3 | — | — |
| Di(phenylthio)carbamic acid, ethyl ester | — | — | — | 0.3 | 0.3 |
| Mooney Scorch at 121° C. | | | | | |
| $t_5$, minutes | 25.0 | 45.2 | 50.7 | 40.9 | 41.9 |
| % increase in scorch delay | — | 81 | 103 | 64 | 68 |
| Stress-Strain at 153° C. | | | | | |
| $M_{300}$, MPa | 12.5 | 13.4 | 11.3 | 12.0 | 11.2 |
| UTS, MPa | 29.3 | 27.9 | 28.7 | 28.3 | 28.3 |
| Elong., % | 570 | 550 | 580 | 660 | 590 |

Styrene-butadiene rubber compositions of the invention are illustrated in Table 4. In synthetic rubber stocks slightly larger quantities of inhibitor are used, 0.5 parts by weight per 100 parts by weight rubber. If greater scorch delay is required larger quantities of inhibitor may be used. Of the four compounds tested, (cyclohexylthio)phenylcarbamic acid, methyl ester exhibits the greater potency.

Compositions of the invention are further illustrated in Table 5. Stock 1 is a control. Stock 3 shows that inhibitors containing cycloalkylthio radicals are especially potent inhibitors. Stock 4 and Stock 5 (duplicate experiments) illustrate a prior art inhibitor containing two phenylthio radicals. Surprisingly, an inhibitor of the invention containing a single phenylthio radical (Stock 2) exhibits greater inhibitor activity. Apparently, replacement of a phenylthio radical by a phenyl radical results in a superior class of inhibitors.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A vulcanizable rubber composition inhibited from premature vulcanization comprising sulfur-vulcanizable rubber, sulfur vulcanizing agent, organic vulcanization accelerating agent, and, in an amount effective to inhibit premature vulcanization, a compound of the formula

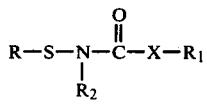

wherein X is oxygen or sulfur, R is $C_1$–$C_{12}$ primary or secondary alkyl or said alkyl radical substituted by formyl or $C_2$–$C_7$ acyl, $C_7$–$C_{10}$ aralkyl, $C_5$–$C_{12}$ cycloalkyl, or $R_2$; $R_1$ is $C_1$–$C_{12}$ alkyl, $C_7$–$C_{10}$ aralkyl, $C_5$–$C_{12}$ cycloalkyl or $R_2$; $R_2$ is phenyl, naphthyl and phenyl substituted by $(-R_3)_x$ wherein x is 1, 2, 3 and $R_3$ is $C_1$–$C_{12}$ alkyl, $C_1$–$C_{12}$ alkoxy, $C_1$–$C_{12}$ alkylthio, chloro, bromo, cyano or nitro.

2. The composition of claim 1 in which the vulcanizing agent is elemental sulfur and the rubber is a diene rubber.

3. The composition of claim 2 in which $R_2$ is phenyl.

4. The composition of claim 3 in which X is oxygen.

5. The composition of claim 4 in which R and $R_1$ independently are $C_1$–$C_6$ alkyl, cyclohexyl or phenyl.

6. The composition of claim 5 in which $R_1$ is phenyl.

7. The composition of claim 5 in which $R_1$ is methyl.

8. The composition of claim 6 in which R is cyclohexyl.

9. The composition of claim 6 in which R is isopropyl.

10. The composition of claim 6 in which R is phenyl.

11. The composition of claim 7 in which R is cyclohexyl.

12. The composition of claim 7 in which R is isopropyl.

13. The composition of claim 7 in which R is phenyl.

14. The composition of claim 2 in which X is sulfur, R and $R_1$ independently are $C_1$–$C_6$ alkyl, cyclohexyl or phenyl.

15. The composition of claim 14 in which $R_2$ is phenyl.

16. A method of inhibiting premature vulcanization of sulfur vulcanizable rubber containing a sulfur vulcanizing agent and organic vulcanization accelerating agent which comprises incorporating therein, in an amount effective to inhibit premature vulcanization, a compound of the formula

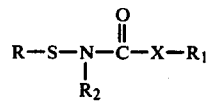

wherein X is oxygen or sulfur, R is $C_1$–$C_{12}$ primary or secondary alkyl or said alkyl radical substituted by formyl or $C_2$–$C_7$ acyl, $C_7$–$C_{10}$ aralkyl, $C_5$–$C_{12}$ cycloalkyl, or $R_2$; $R_1$ is $C_1$–$C_{12}$ alkyl, $C_7$–$C_{10}$ aralkyl, $C_5$–$C_{12}$ cycloalkyl or $R_2$; $R_2$ is phenyl, naphthyl and phenyl substituted by $(-R_3)_x$ wherein x is 1, 2, 3 and $R_3$ is $C_1$–$C_{12}$ alkyl, $C_1$–$C_{12}$ alkoxy, $C_1$–$C_{12}$ alkylthio, chloro, bromo, cyano or nitro.

17. The method of claim 16 in which the vulcanizing agent is elemental sulfur and the rubber is a diene rubber.

* * * * *